United States Patent [19]

Lundstrom et al.

[11] 4,370,181

[45] Jan. 25, 1983

[54] PYROTECHNIC NON-AZIDE GAS GENERANTS BASED ON A NON-HYDROGEN CONTAINING TETRAZOLE COMPOUND

[75] Inventors: Norman H. Lundstrom, Tacoma, Wash.; Graham C. Shaw, Garland, Utah

[73] Assignee: Thiokol Corporation, Newtown, Pa.

[21] Appl. No.: 221,943

[22] Filed: Dec. 31, 1980

[51] Int. Cl.³ ............................................. C06B 45/00
[52] U.S. Cl. ................................... 149/2; 149/109.2; 149/109.4; 264/3 C; 280/728
[58] Field of Search ............. 149/2, 109.2, 109.4; 264/3 C; 280/728

[56] References Cited

U.S. PATENT DOCUMENTS

| | | | |
|---|---|---|---|
| 3,741,585 | 6/1973 | Hendrickson et al. | 280/150 |
| 3,912,561 | 10/1975 | Doin et al. | 149/35 |
| 3,928,964 | 12/1975 | Hamilton | 149/109.4 |
| 4,203,787 | 5/1980 | Kirchoff et al. | 149/35 |
| 4,296,984 | 10/1981 | Adams et al. | 423/351 |

*Primary Examiner*—Stephen J. Lechert, Jr.
*Attorney, Agent, or Firm*—Gerald K. White

[57] ABSTRACT

A solid non-azide composition for generating non-toxic nitrogen gas intended for use in the deployment of inflatable safety crash bags for driver and passenger protection in vehicles consists essentially of a non-hydrogen containing tetrazole compound and a non-oxygen containing oxidizer, examples of the tetrazole being di-alkali metal or mono-alkaline earth metal salts of 5,5'-bitetrazole, and examples of the oxidizer being sulfur, molybdenum disulfide, chromium trichloride and iron trifluoride.

18 Claims, No Drawings

PYROTECHNIC NON-AZIDE GAS GENERANTS BASED ON A NON-HYDROGEN CONTAINING TETRAZOLE COMPOUND

BACKGROUND OF THE INVENTION

A. Field of the Invention

This invention relates to solid gas generants particularly those suitable for the production of substantially pure nitrogen gas, and more particularly to the use of non-azide gas generant compositions that are characterized by their freedom, when burned, from the formation of toxic species such as hydrogen cyanide, nitrogen oxides and carbon monoxide.

B. Description of the Prior Art

There has been considerable interest in the generation of nitrogen gas for a number of purposes including the inflation of aircraft or automobile safety crash bags, also termed air bags.

The details of the crash bag systems have been widely discussed as have the reasons for the selection of pyrotechnic devices for the generation, rapidly and dependably, of the gas for inflating the bag. The operational constraints of crash bags are also well known. The system must supply absolutely nontoxic gas to inflate the bag because crash bag systems generally vent into the passenger compartment on deflation, and because of the very real probability of bag rupture in an actual crash situation. Additionally, the gas must inflate the bag at a temperature which the vehicle occupant can tolerate. The time period for attainment of maximum inflation has been determined to be from 20 to 100 milliseconds. The device must be safe to handle and store prior to production. It must be adaptable to mass production line installation techniques and not introduce an unreasonable hazard then or during the life of the vehicle. It must assure reliable operation during the life of the vehicle containing it, which may be 10 years or longer.

The objectives of rapid generation of cool non-toxic inflation gas and long-term operability depend to a large extent on the gas generant selected and the physical form into which it is initially compounded.

If a suitable propellant can be designed, then the design of a complete passive restraint system undertaken with consideration of the characteristics of a particular propellant stands a better chance of practical success.

Naturally, from every point of view, the most desirable atmosphere inside an inflated crash bag would correspond in composition to the air outside it. This has thus far proven impractical of attainment. The next best solution is inflation with a physiologically inert or at least innocuous gas. The most practical of these gases has proven to be nitrogen.

The most successful of the prior art solid gas generants of nitrogen that are capable of sustained combustion have been based upon the decomposition of compounds of alkali metal, alkaline earth metal and aluminum derivatives of hydrazoic acid, especially sodium azide. Such a nitrogen gas generant comprising mixtures of alkali metal azides, metal and metalloid oxides, molybdenum disulfide, and optionally sulfur, pressed into pellets is disclosed in U.S. Pat. No. 4,203,787 that was granted on May 20, 1980 to George F. Kirchoff and Fred E. Schneiter.

There are disadvantages, however, to the use of these azides, particularly in the generation of the inflating gas for air bag systems.

Sodium azide, a Class B explosive, is a highly toxic material. It is easily hydrolyzed, forming hydrazoic acid which is not only a highly toxic and extremely sensitive explosive gas, but it also readily reacts with heavy metals such as copper, lead, etc. to form extremely sensitive solids that are subject to unexpected ignition or detonation. Especial handling in the manufacture, storage and eventual disposal is required to safely handle such materials and gas generants prepared from the azide compounds.

A number of approaches to a non-azide nitrogen gas generant have been investigated in the prior art, as disclosed, for example, in U.S. Pat. Nos. 3,004,959, 3,055,911, 3,171,249, 3,719,604 and 3,873,477. Many of the prior art nitrogen gas generants that have been reported are based upon nitrogen-containing compounds such as those derived from the various hydroxamine acid and hydroxylamine derivatives, while others consist of various polymeric binders, hydrocarbons and carbohydrates which are oxidized to produce non-corrosive and, often termed, "non-toxic" gases. The gas products from these compositions contain unacceptably high levels of carbon dioxide, carbon monoxide and water for use in crash bag applications where the possibility exists that the occupant may breathe, even for short periods of time, high concentrations of the gases produced from the gas generant. These compositions do not meet the present requirements that the combustion products meet industrial standards for toxic and other gases such as carbon monoxide, carbon dioxide, etc.

Other approaches to a non-azide nitrogen gas generant consist of using tetrazole compounds such as aminotetrazole, metal salts of aminotetrazole, or other tetrazole salts which contain hydrogen in the molecule with oxygen containing oxidizers such as potassium perchlorate. These mixtures, when burned, tend to form various toxic species such as hydrogen cyanide, nitrogen oxides, and carbon monoxide, and hence, also do not meet the present requirements in respect of the combustion products that are produced.

SUMMARY OF THE INVENTION

Among the objects of the invention is the prevention of the formation of toxic species in non-azide nitrogen gas generants by utilizing high nitrogen tetrazole compounds which have no hydrogen in the molecule, examples of which are di-alkali metal or mono-alkaline earth metal salts of 5,5'-bitetrazole, with oxidizers which contain no oxygen in the molecule, examples of which are sulfur, molybdenum disulfide, chromium trichloride, etc.

The use of a composition having a high nitrogen content and containing no hydrogen with a non-oxygen containing oxidizer such as those mentioned above is especially advantageous. It is noted that if hydrogen were contained in the composition, water would be a product of the combustion, and the reaction of the water with sulfur, for example, would produce hydrogen sulfide, $H_2S$, a highly toxic gas, the presence of which in the bag in concentrations of thirty (30) parts per million (ppm) or greater, are considered to be unacceptable in crash bag applications. Concentrations of $H_2S$ of less than 30 ppm are not considered to be toxic and are acceptable for such applications.

The composition has the additional advantage of being insensitive to accidental ignition by friction or impact. Since the gas generant composition and its combustion products are not highly toxic materials, they do not require specialized handling techniques to minimize toxicity or contamination problems in fabrication, storage, or disposal of generator units that contain the gas generant composition. The combustion products of the compositions are primarily nitrogen gas and innocuous solid decomposition products.

The invention relates particularly to a method of making and treating mixtures of non-hydrogen containing metal salts of 5-5'-bitetrazole with non-oxygen containing oxidizers for producing a non-toxic gas for inflating air bags. Examples of such mixtures are given hereinafter.

The invention provides a method for the generation of substantially pure and substantially particle free nitrogen gas at pressures below 2000 psia in the gas generator chamber, where generation is initiated at normal room temperature which comprises according to the concept above mentioned:

(a) treating a nitrogen gas generant composition comprising a mixture of 60 to 90 weight percent of a non-hydrogen containing metal salt of 5,5'-bitetrazole and 10 to 40 weight percent of a non-oxygen containing oxidizer with hot combustion products of an igniter combustion mixture of 5 to 25 weight percent boron and 75 to 95 weight percent potassium nitrate, said hot combustion products being of sufficient quantity to induce and sustain oxidation of said salt of 5,5'-bitetrazole by said oxidizer; and (b) passing the products of combustion of said nitrogen gas generant composition through cooling, filtration and pH adjustment means.

DESCRIPTION OF THE PREFERRED EMBODIMENT

The manner and method of making and using the nitrogen gas generant compositions of the invention according to the above concept of the invention described herein will now be described with reference to specific embodiments thereof, namely nitrogen gas generant compositions consisting of a non-hydrogen containing metal salt of 5,5'-bitetrazole arranged to be oxidized with non-oxygen containing oxidizers.

In order to prepare the gas generant composition, the metal salt of 5,5'-bitetrazole and the oxidizer, which are commercially available, may be dry blended as powders by standard methods. The blended powder, may, if desired for use where rapid, controlled, repeatable, and long term reliably accurate performance is intended, be compressed into tablets, granules or pellets by conventional techniques. Since the components of the gas generant composition and the composition itself are not highly toxic, special handling techniques to minimize toxicity are not required in the fabrication of the composition or in the pelletizing thereof.

The following are some examples of mixtures, according to the invention of non-hydrogen containing metal salts of 5,5'-bitetrazole with non-oxygen containing oxidizers:

(a) Disodium Bitetrazole/Sulfur

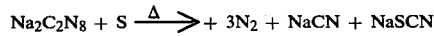

which theoretically results in 39% nitrogen;

(b) Disodium Bitetrazole/Chromium Trichloride

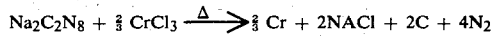

which theoretically results in 39% nitrogen;

(c) Disodium Bitetrazole/Molybedenum Disulfide

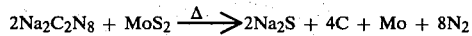

which theoretically results in 42.7% nitrogen;

(d) Dipotassium Bitetrazole/Sulfur

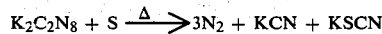

which theoretically results in 33% nitrogen;

(e) Dipotassium Bitetrazole/Chromium Trichloride

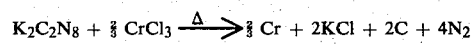

which theoretically results in 35% nitrogen;

(f) Calcium Bitetrazole/Iron Trifluoride

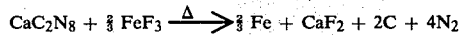

which would theoretically form 44.6% nitrogen.

As will be observed by those skilled in the art, large quantities of nitrogen gas result when examples (a) through (f) are combusted and theoretically should not form toxic decomposition gases. Examples (a) and (d) that use sulfur, S, as the oxidizer respectively yield NaCN and NaSCN as solid decomposition products that are substantially all removed by the filtration system and don't affect the gas being produced and inflating the bag. Example (c) that uses molybdenum disulfide as the oxidizer yields Na2S as a solid decomposition product which can be readily neutralized to iron sulfide utilizing a state of the art neutralizer system which was developed for sodium azide/molybdenum disulfide gas generants, as disclosed, for example, in copending application of Gary Adams and Fred Schneiter bearing U.S. patent application Ser. No. 088,992 filed Oct. 29, 1979 and issued as U.S. Pat. No. 4,296,084 on Oct. 20, 1981. The examples using chromium trichloride result in all of the decomposition products, gaseous of solid, being innocuous forming nitrogen, sodium chloride, carbon, and chromium metal.

The particle sizes of the generant composition components are not particularly critical and the commercially available materials sized as powders or small crystals are suitable. When rapid combustion rates are essential, the particle size must be more closely controlled. Submicron size particles may be employed in preparing pelletized gas generant compositions. Particle sizes of 0.7 to 0.9μ are particularly preferred in obtaining embodiments of the invention with burning rates within the desired range.

One skilled in the art will recognize that as the compositions of the instant invention are cooler burning than those of the prior art as much as 200° C. lower than earlier compositions, they require a hotter initiator to start the combustion process reliably. Although many equivalent initiators will occur to one skilled in the art, and the use of such equivalents is comprehended in the process of the invention both in the specification and appended claims, a particularly convenient and preferred initiator composition is one consisting of 5 to 25 weight percent, preferably about 10 weight percent boron; 75 to 95 weight percent, preferably about 85 weight percent potassium nitrate to which mixture is added 3 to 10 weight percent, preferably about 5 weight percent lead azide. Firing of the initiator composition may be by standard electrical means including any desired safety devices in the circuitry, such as spark gaps and/or ferrite resistors to prevent unwanted initiation from strong radio frequency or high voltage sources, at the option of the designer of the system.

While the gas generant composition of this invention may be employed as the charge in conventional gas generants of the prior art, they are most advantageously employed in the particular gas generator construction described in the aforementioned copending application of Gary Adams and Fred Schneiter.

This gas generator, which has a concentric configuration with the initiator at the center of a suitable reaction chamber surrounded by the gas generant compositions in suitable pelletized form which is in turn surrounded by wire screen, specially selected woven fiber glass cloth, and a second layer of wire screen covering radially arranged exit ports to a concentric diffusion chamber, the radially arranged exit ports of which are filtered by wire screen supporting an aluminum silicate fiber mat as a secondary filter, enables the advantageous characteristics of the inventive embodiments to be fully utilized.

Specifically, the pyrotechnique material of the initiator, the gas generant composition and the primary filter are all contained in a hermetically sealed aluminum cartridge. This insures reliability of the generator over long periods. The aluminum cartridge is positioned in the combustion chamber of the generator. Upon initiation of combustion by the firing of the squib, the rising gas pressure ruptures the side wall areas of the cartridge adjacent the orifices of the combustion chamber. This allows gas to flow through the primary filter and out of the combustion chamber through the several orifices. The combustion chamber filter consists of one to three layers of a coarse screen adjacent to the wall of the chamber. This serves as a collecting area for gas to flow along the chamber wall to the chamber orifices and permits gas to flow evenly through the primary filter regardless of the proximity of a combustion chamber orifice. Inboard of the coarse screen are one or more layers of fiberglass woven fabric. The fiberglass fabric is selected for compatibility with the temperature in the combustion chamber during burning of the selected gas generant composition thereby to provide a tacky surface for particle entrapment that does not melt or erode away under the effects of the high temperature gas. An effect accompanying the production of the tacky surface appears to be a swelling of the fibers of the fiberglass fabric that reduces the porosity of the primary filter. It is believed that this swelling causes the primary filter to restrict the flow of gas and combustion residue out of the combustion chamber. This effect is believed to continue for only a short interval, up to about 3 milliseconds, but long enough to allow cooling and condensation of hot and molten particulate residue within the voids of the filter. Inside the multiple layers of the fiberglass cloth are multiple layers of fine mesh carbon steel screen. The layers of the fine mesh carbon steel provide a large relatively cool surface for condensation of combustion solids prior to encountering the multiple layers of fiberglass woven fabric. Approximately 95 percent of all solid products of combustion are trapped in the combustion chamber filter. It is noted that outside of the combustion chamber, the velocity of the gases that are generated becomes so high that trapping of the products of combustion in that region becomes exceedingly difficult.

The secondary filter is comprised of multiple wraps of wire mesh which serves to cool the gas and provide surface for condensation of solid particles. Surrounding the wire mesh filter pack are one or more wraps of the aluminum silicate blanket.

Surrounding the aluminum silicate blanket are several wraps of fine mesh screen which provide structural support for the aluminum silicate blanket. It is noted that aluminum silicate blanket is porous, has very little strength, and tends to disintegrate under the effects of the high velocity gas stream. The filter elements, however, retain the solids entrapped. The fine mesh outer screen is used to trap these aluminum silicate filter particles and prevent them from being carried out of the exit orifices of the housing with the clean combustion gases.

One skilled in the art will recognize that the successful initiation of combustion of any gas generant requires the use of an adequate quantity of initiator to insure that sufficient hot combustion products of the initiator contact enough of the exposed generant surface to kindle a self sustaining flame front. The selection of such amounts by a number of simple graduated experiments for any initiator-gas generant combination is well within the skill of a journeyman in the art. In the case of the compositions of the instant invention from 0.02 g to 0.03 g, preferably from 0.024 g to 0.026 g of the boron, potassium nitrate, lead azide initiator described herein per gram of gas generant composition may be employed.

One skilled in the art will also recognize that although the combustion temperature of the instant compositions is significantly lower than those of the prior art, in order to reduce the gas temperature in the crash bag to a level tolerable by the vehicle occupants, additional cooling means must be provided. In addition to the cooling method of the aforementioned Schneiter and Adams copending application, the standard cooling means, normally layers of woven metal mesh which additionally may serve as conventional filtration means may be employed. One skilled in the art will also recognize that the effluent gases from combustion of the instant composition may contain sufficient alkaline material to cause burns or discomfort to someone coming in contact therewith. In addition to the fiberglass of the aforementioned Schneiter and Adams application, the conventional neutralizers of the prior art, conveniently carbonate salts, may be employed to adjust the pH of the effluent gases from combustion of the compositions of this invention to levels tolerable by humans, conveniently pH levels below 10.0.

EXAMPLE I

Experimental confirmation of the concept first mentioned hereinbefore has been established by firing a 75 gram charge of the disodium bitetrazole/sulfur system in a full size driver inflator into an evacuated tank. Ballistics, pressure data, and gas analysis was determined in the following data:

Work Request No.: 768

| | |
|---|---|
| Formulation Number: | RDLNB F-1651-29-2R |
| Propellant Type: | Disodium Bitetrazole/Sulfur |
| Generator Type: | Inland Driver Heavy Wt. |
| Squib Type: | S-109 |
| Igniter Charge: | U1X-172 (3g) |
| Propellant Pellet Size: | 0.030 in. |
| Propellant Wt., Grams: | 75 |
| Inflator Max. Pressure, psi: | 1550 at 2.5 msec |
| Tank Pressure | |
| psi at 40 msec: | 18 |
| psi at 210 msec: | 24 |
| Gas Analysis (Dragger)* | |
| Carbon Monoxide | 1800 ppm |
| Hydrogen Sulfide | 16 ppm |
| Hydrogen Cyanide | 25 ppm |
| Nitrogen Dioxide | Not detected |
| Sulfur Dioxide | Not detected |

*Low concentration of toxic gases attributed to slight moisture in generator and various organic materials used in fabricating the hardware.

As noted hereinbefore concentrations of hydrogen sulfide in the bag of less than thirty (30) parts per million (ppm) are not considered to be toxic, and hence, are acceptable for crash bag applications. The hydrogen sulfide concentration of 16 ppm determined in the above analysis of Example I and resulting from sources other than the gas generating composition employed is well within the acceptable range of non-toxicity for crash bag applications. Potentially toxic constituents such as carbon monoxide and hydrogen cyanide are not produced in toxic amounts.

Thus, there has been provided in accordance with the invention a non-azide, non-toxic solid nitrogen gas generating pellet consisting essentially of a non-hydrogen containing tetrazole compound and a non-oxygen containing oxidizer for the generation of substantially pure and substantially particle free nitrogen gas at pressures below 2000 psia in the gas generator chamber and consequently having particular utility in the deployment of inflatable crash bags for driver and passenger protection in aircraft, automobiles and other fast vehicles.

Subject matter discloses but not claimed in this application is disclosed and is being claimed in the co-pending application, filed concurrently herewith of Graham C. Shaw bearing Ser. No. 221,942, filed Dec. 13, 1980.

We claim:

1. A solid pellet for generating non-toxic nitrogen gas consisting essentially of a non-hydrogen containing tetrazole compound and a non-oxygen containing oxidizer selected from the group consisting of sulfur, chromium trichloride, molybdenum disulfide, iron trifluoride, and admixture thereof.

2. The pellet of claim 1 wherein said tetrazole comprises a bitetrazole.

3. The pellet of claim 1 wherein said tetrazole comprises metal salt of a tetrazole compound.

4. The pellet of claim 3 wherein said tetrazole compound comprises a bitetrazole.

5. The pellet of claim 3 wherein said metal salt of a tetrazole is selected from the group consisting of alkali metal salts, alkaline earth metal salts, manganese, and admixtures thereof.

6. The pellet of claim 5 wherein said metal salt of a tetrazole is disodium bitetrazole.

7. The pellet of claim 5 wherein said metal salt of a tetrazole is dipotassium bitetrazole.

8. The pellet of claim 5 wherein said metal salt of a tetrazole is calcium bitetrazole.

9. The pellet of claim 1 wherein said oxidizer is sulfur.

10. The pellet of claim 1 wherein said oxidizer is chromium trichloride.

11. The pellet of claim 1 wherein said oxidizer is molybdenum disulfide.

12. The pellet of claim 1 wherein said oxidizer is iron trifluoride.

13. The pellet of claim 1 wherein said tetrazole compound is present in an amount from about 60 to about 90 weight percent and said oxidizer in an amount from about 10 to about 40 weight percent.

14. In a method for inflating an air bag comprising igniting a pellet of pyrotechnic material to generate a gas, filtering and cooling the generated gas, and rising the filtered and cooled gas to inflate the air bag, the improvement comprising the step of using a solid pellet for generating non-toxic nitrogen gas consisting essentially of a non-hydrogen containing tetrazole compound and a non-oxygen containing oxidizer selected from the group consisting of sulfur, chromium trichloride, molybdenum disulfide, iron trifluoride, and admixtures thereof, whereby the air bag when inflated contains a concentration of less than 30 ppm of hydrogen sulfide.

15. A method for the generation of a non-toxic nitrogen gas which comprises:
 (a) compounding a gas generant composition consisting essentially of a non-hydrogen containing tetrazole compound and a non-oxygen containing oxidizer selected from the group consisting of sulfur, chromium trichloride, molybdenum disulfide, iron trifluoride, and admixtures thereof;
 (b) pelletizing said composition; and
 (c) igniting said pelletized composition to produce a non-toxic nitrogen gas.

16. The method of claim 15, whereby said non-toxic nitrogen gas contains less than 30 ppm hydrogen sulfide.

17. The method of claim 15, whereby said non-toxic nitrogen gas contains carbon monoxide and hydrogen cyanide in non-toxic amounts.

18. The method of claim 15, whereby said tetrazole compound is present in an amount from about 60 to about 90 weight percent and said oxidizer in an amount from 10 to 40 weight percent.

* * * * *